UNITED STATES PATENT OFFICE 2,266,404

DYESTUFFS OF THE PHTHALOCYANINE SERIES

Berthold Bienert, Leverkusen-Wiesdorf, and Hermann Thielert, Cologne-Merheim, Germany, assignors to General Aniline & Film Corporation, New York, N. Y., a corporation of Delaware No Drawing. Application January 9, 1940, Serial No. 313,098. In Germany December 30, 1938

4 Claims. (Cl. 260—314)

The present invention relates to new water-soluble phthalocyanines which represent valuable substantive dyestuffs for vegetable fibers and are valuable starting materials for the preparation of color lakes. Our new products may be defined by the following formula:

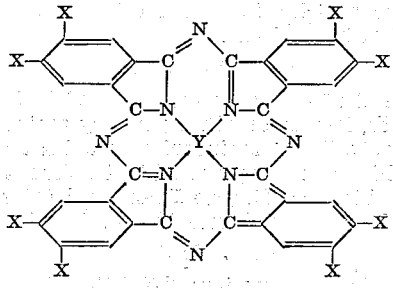

wherein in each of the nuclei one of the X's stands for a sulfonic acid group and the other X stands for an acylamino group and Y indicates that the products contain a heavy metal in complex combination. Such compounds of the character described are preferred as contain a heavy metal in complex combination and among those the copper phthalocyanines. The acylamino group may be of the aliphatic or aromatic series, preferred substituents being the benzoylamino group and those derivatives thereof having one or several of the hydrogens of the benzene nucleus replaced by alkoxy and/or halogen atoms. The new dyestuffs which correspond to the above formula exhibit an excellent affinity towards vegetable fibers, such as cotton and viscose or cuprammonium silk and show the most greenish shade which has been obtained up to the present within the class of water-soluble phthalocyanine dyestuffs. Moreover, the clearness of shade and the fastness properties of these compounds are such as cannot be found within any other class of dyestuffs, be it the azo, triphenylmethane or anthraquinone series.

We are aware of the fact that acylamino phthalocyanines have been prepared prior to our present invention by sulfonating a tetraacetylamino copper phthalocyanine and reintroducing the acetyl radicals which have been split off during the sulfonation process. We wish to point out, however, that the prior known methods of after-sulfonation do not allow one to introduce into the phthalocyanine molecule more than two or at the most three sulfonic acid groups, whereas our present compounds are characterized by their containing four sulfonic acid groups. Moreover, there is reason to assume that in the case of an after-sulfonation the sulfonic acid group will never enter the same position as in the case of our present compounds. At any rate, our present tetrasulfonic acid compounds are superior to the prior known products as to the clearness of shades and as to the fastness towards acids.

The new phthalocyanine dyestuffs can be prepared in various ways. For instance we can start from phthalic acids containing a sulfonic acid group in 4-position and an acylamino group in 5-position. Such starting materials can be converted into phthalocyanines by heating the same with urea and metal salts, such as those of copper, nickel or cobalt without involving the danger of splitting off the acyl group. In the phthalocyanines thus obtained the acyl radical can be replaced by another acyl radical by saponification and subsequent acylation. Another method of working consists in that 5-halogen-4-sulfophthalic acids are converted into phthalocyanines, the halogen is replaced by the amino group and such products are subjected to the action of an acid chloride. The acylation is preferably performed in the presence of sulfonic acid, oleum or chlorosulfonic acid. In accordance with still another process we are starting from 5-amino-4-sulfophthalic acids, convert the same into phthalocyanines in the manner described above and then subjecting the phthalocyanines thus obtained to the action of an acylating agent.

As a matter of fact, our new dyestuffs can also be employed as color lakes. For this purpose they are converted into insoluble salts, for instance into the calcium or barium salts, the resulting pigment dyestuffs being distinguished by an excellent clearness and very good fastness properties.

The invention is illustrated by the following examples, without being restricted thereto, the parts being by weight:

Example 1

111 parts of the monopotassium salt of the 5-acetylamino-4-sulfophthalic acid are mixed while stirring with 111 parts of melted urea at 150° C., thereupon 2.2 parts of ammonium molybdate and 17.0 parts of crystallized copper chloride are added, and the melt is subsequently heated while thoroughly stirring for 4 hours to 160–165° C., 34 parts of urea being gradually added thereto. The melt is contacted with water, the dyestuff formed being precipitated by the addition of common salt. By redissolution from dilute soda solution and precipitation with common salt the dyestuff may be purified, if desired. It is readily soluble in water and dyes cotton clear green shades.

By heating the dyestuff with hydrochloric acid or sulfuric acid saponification takes place with the formation of the salts of the 5.5'.5''.5'''-tetraamino-copperphthalocyanine - 4.4'.4''.4'''-tetrasulfonic acid, this product showing a bluish coloration. This amino compound may be converted into new dyestuffs by treatment with other acylating agents as it is more fully described in Example 5.

Example 2

If the monopotassium salt of the 5-acetyl-amino-4-sulfophthalic acid as described in Example 1 is replaced by 136 parts of the monopotassium salt of the 5-benzoylamino-4-sulfophthalic acid, a dyestuff is obtained being readily soluble in water which dyes cotton clear yellowish green shades.

Instead of copperchloride also other metal salts may be used, for instance nickel-, cobalt-, or iron chloride, dyestuffs of similar properties being obtained thereby.

The 5-acylamino-4-sulfophthalic acids may be prepared according to the following reaction equation:

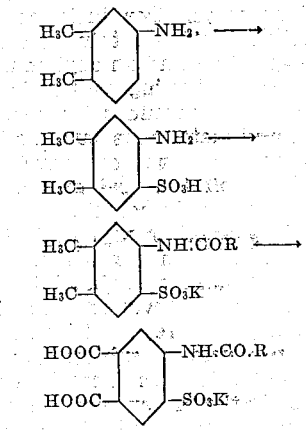

The monopotassium salts of the acylaminosulfophthalic acids are colorless compounds which are readily soluble, for instance, in water.

Example 3

A mixture of 500 parts of a 27% ammonia solution, 0.5 part of copper powder, 1.0 part of copper chloride and 50 parts of the sodium salt of the 5.5'.5''.5'''-tetrabromo-copper phthalocyanine-4.4'.4''.4'''-tetrasulfonic acid or of the corresponding chloro compound are heated to 155–160° C. in an autoclave while stirring for about 10 hours.

The dyestuff salt precipitated is separated from the ammonia solution, dissolved in water, filtered and reprecipitated from the filtrate by the addition of common salt. A copper phthalocyanine-4.4'.4''.4'''-tetrasulfonic acid is obtained which in the average contain 4 amino groups in the molecule and is especially suitable for being reacted upon with acid chlorides, such as benzoylchloride.

Example 4

6.65 parts of the aminosulfonic acid according to Example 3 are dissolved (or suspended) in 40 parts of monohydrate and gradually 8.55 parts of acetic acid anhydride are added drop by drop at 50° C. As soon as the shade of a test dissolved in water does not change any more, the mixture is added to 500 parts of ice water, the dyestuff precipitated being filtered off and washed neutral by means of common salt solution. Thereupon the dyestuff is dissolved in water with the addition of soda solution until the solution shows an alkaline reaction and is then precipitated by means of common salt. A dyestuff is obtained which dyes cotton green shades being more bluish than the dyeings according to Example 1.

Example 5

6.65 parts of the amino sulfonic acid according to Example 3 are dissolved (or suspended) in 40 parts of chlorosulfonic acid and 8.85 parts of benzoylchloride are added drop by drop slowly at 20–30° C. As soon as the shade of a test dissolved in water does not change any more, the mixture is treated as described in Example 4, the excess benzoic acid being removed by treatment with soda solution. The dyestuff obtained dyes cotton clear green shades which are a trifle more bluish than those according to Example 2.

Example 6

If the benzoylchloride mentioned in Example 5 is replaced by the corresponding quantity of o-chlorobenzoylchloride, a dyestuff is obtained of a somewhat bluer shade.

Example 7

If instead of ammonia as described in Example 3 methylamine or other primary amines are used, N-substituted aminosulfonic acids are obtained which can be converted by treatment with acid chloride according to Example 5 (at somewhat higher temperatures) into acyl derivatives.

Example 8

24.3 parts of potassium 5-(2'.4'-dichlorobenzoylamino)-4-sulfophthalate, 0.48 part of ammonium molybdate, 2.19 parts of crystallized copper chloride are added to a melt of 24.3 parts of urea at a temperature of 150–165° C. and then the melt is stirred for about 4 hours at 160–165° C., 14.3 parts of urea being gradually added thereto. After cooling the melt is contacted with water, the dyestuff is precipitated by the addition of common salt, separated, then suspended in a dilute common salt solution and treated therein with a dilute hydrochloric acid until the copper salts are completely removed therefrom. If desired, the mixture is purified once more by redissolution from dilute soda solution.

A dyestuff is obtained being soluble in water which dyes the vegetable fiber clear green shades.

Example 9

A mixture of

| | Parts |
|---|---|
| Urea | 66.0 |
| Potassium 5-(2'-chlorobenzoylamino)-4-sulfophthalate | 43.75 |
| Ammonium molybdate | 0.88 |
| Copper chloride | 4.25 | is heated and worked up as described in Example 8. For the purpose of diluting the melt there may be added further 33 parts of urea.

When working up according to Example 8 a dyestuff is obtained showing similar properties.

Example 10

If the benzoylchloride described in Example 5 is replaced by 4-chlorobenzoylchloride, also bluish-green dyestuffs are obtained with a good affinity towards vegetable fibers.

Example 11

If the benzoylchloride of Example 5 is replaced by 2·4-dichlorobenzoylchloride, a dyestuff is obtained showing good properties similar to those of the dyestuff of Example 10.

Example 12

If the potassium 5-(2'-chlorobenzoylamino)-4-sulfophthalate of Example 9 is replaced by the corresponding quantity of potassium 5-(2-bromo-benzoylamino)-4-sulfophthalate, a dyestuff is obtained which dyes cotton grayish-green shades.

Example 13

In the same way as described in Example 9 a copper phthalocyanine can be obtained from potassium 5 - (3' - chlorobenzoylamino) - 4 - sulfophthalate. The dyestuff is difficultly soluble in water.

Example 14

In the same way as described in Example 9 a copper phthalocyanine can be obtained from potassium 5 - (4' - chlorobenzoylamino) - 4 - sulfophthalate. The dyestuff is still more difficultly soluble than that obtained according to Example 13.

Example 15

According to Example 8 from potassium 5-(2',5' - dichlorobenzoylamino) -4-sulfophthalate a dyestuff is obtained being readily soluble in water which, for instance, dyes cotton clear green shades.

Example 16

Into a melt of 8.66 parts of urea there is added while stirring a mixture of

| | |
|---|---|
| Urea parts | 17.32 |
| Potassium 5-(2'-methoxybenzoylamino)-4-sulfophthalate parts | 17.32 |
| Crystallized copper chloride grams | 1.70 |
| Ammonium molybdate do | 0.48 | at 160–165° C. The melt is kept at 160–165° C. for about 4 hours, further 8.66 parts of urea being added thereto and the whole is worked up in in the usual manner. The dyestuff obtained is easily soluble in water and dyes cotton and viscose silk clear, yellowish-green shades. The clearness of the shade is such as to suggest the use of the product as color lake; to this end it is converted for instance into its calcium or barium salt.

Example 17

If the starting material described in Example 16 is replaced by the corresponding meta-methoxybenzoylamino compound, dyestuffs are obtained of similar properties.

Example 18

If in Example 17 instead of the meta-methoxybenzoylamino compound the para-methoxybenzoylamino compound is used, a dyestuff is obtained showing similar properties.

Example 19

To a melt of 8.2 parts of urea there is added while stirring at 160–165° C. a mixture of

| | Parts |
|---|---|
| Urea | 32.8 |
| Potassium 5-(2'-chloro-5'-methoxybenzoylamino)-4-sulfophthalate | 32.8 |
| Crystallized copper chloride | 3.4 |
| Ammonium molybdate | 1.0 |

The melt is kept at 160–165° C. for about 4 hours, further 8.2 parts of urea being added thereto. A dyestuff is obtained being readily soluble in water, which dyes the vegetable fiber bluish-green shades, which are still more bluish than those of the dyestuff obtained according to Example 16.

Example 20

If according to Example 19 the potassium 5 - (2'-chloro-6'-methoxybenzoylamino) -4-sulfophthalate is used, a dyestuff is obtained being very readily soluble in water and showing a slight affinity to cotton.

Example 21

Into a melt of 4.6 parts of urea there is added while stirring at 160–165° C. a mixture of

| | Parts |
|---|---|
| Urea | 18.4 |
| Potassium 5 - (3'-acetylaminobenzoylamino)-4-sulfophthalate | 18.4 |
| Crystallized copper chloride | 1.7 |
| Ammonium molybdate | 0.56 |

The melt is still heated at 160–165° for about 4–5 hours, further 4.6 parts of urea being added thereto. The working up is performed in the usual manner the resulting dyestuff being difficultly soluble and less suitable for the dyeing of vegetable fibers but showing an excellent fastness to light if employed as lake dyestuff.

Example 22

If the potassium 5-(3'-acetylaminobenzoylamino)-4-sulfophthalate according to the preceding example is replaced by potassium 5-(4'-acetylaminobenzoylamino)-4-sulfophthalate a dyestuff is obtained which is less suitable for the dyeing of vegetable fibers but shows an equally excellent fastness to light if employed as lake dyestuff.

Example 23

4.03 parts of urea are molten; thereupon a mixture of

| | Parts |
|---|---|
| Urea | 16.12 |
| Potassium 5-benzoylamino-4-sulfophthalate | 16.12 |
| Crystallized nickel chloride | 2.38 |
| Ammonium molybdate | 0.403 | is added while stirring at 160–165° C. While adding from time to time 16.12 parts of urea the melt is kept for further 4 hours at 160–165° C. and the working up is performed in the usual manner.

The dyestuff dyes cotton somewhat duller and more bluish shades than the corresponding copper dyestuff.

We claim:

1. Heavy metal complexes of the products of the following formula:

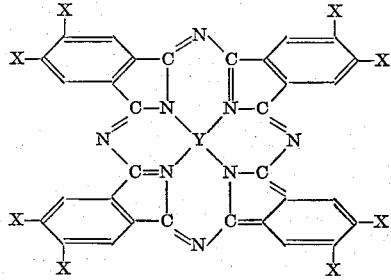

wherein in each of the nuclei one of the X's stands for a sulfonic acid group and the other X stands for an acylamino group and Y indicates that the products contain a heavy metal in complex combination.

2. The products as claimed in claim 1 wherein the acylamino group is a benzoylamino group.

3. The products as claimed in claim 1 wherein the acylamino group is a halogenbenzoylamino group.

4. The products as claimed in claim 1 wherein the acylamino group is an alkoxybenzoylamino group.

BERTHOLD BIENERT.
HERMANN THIELERT.